United States Patent
Yokoi

(10) Patent No.: US 8,730,582 B2
(45) Date of Patent: May 20, 2014

(54) MICROSCOPE APPARATUS

(75) Inventor: Eiji Yokoi, Tokyo (JP)

(73) Assignee: Olympus Corporation, Tokyo (JP)

( * ) Notice: Subject to any disclaimer, the term of this patent is extended or adjusted under 35 U.S.C. 154(b) by 122 days.

(21) Appl. No.: 13/412,040

(22) Filed: Mar. 5, 2012

(65) Prior Publication Data

US 2012/0229883 A1 Sep. 13, 2012

(30) Foreign Application Priority Data

Mar. 10, 2011 (JP) ................................. 2011-053070

(51) Int. Cl.
*G02B 21/02* (2006.01)
*G02F 1/01* (2006.01)

(52) U.S. Cl.
CPC ...................................... *G02B 21/02* (2013.01)
USPC .......................................... 359/656; 359/279

(58) Field of Classification Search
USPC .......................................... 359/279, 656–661
See application file for complete search history.

(56) References Cited

U.S. PATENT DOCUMENTS

| | | | |
|---|---|---|---|
| 6,285,019 B1 | 9/2001 | Engelhardt et al. | |
| 6,771,417 B1 | 8/2004 | Wolleschensky et al. | |
| 7,675,676 B2 | 3/2010 | Nakata | |
| 7,733,564 B2 | 6/2010 | Wolleschensky et al. | |
| 8,072,680 B2 | 12/2011 | Nakata | |
| 2001/0003488 A1 | 6/2001 | Yoshida | |
| 2003/0197924 A1 | 10/2003 | Nakata | |
| 2006/0043184 A1 | 3/2006 | Fukuchi et al. | |
| 2007/0081241 A1 | 4/2007 | Hayashi | |
| 2010/0214404 A1 | 8/2010 | Chen et al. | |
| 2012/0038980 A1 | 2/2012 | Nakata | |

FOREIGN PATENT DOCUMENTS

| | | |
|---|---|---|
| JP | 2006-72280 A | 3/2006 |
| JP | 2006-275915 A | 10/2006 |
| JP | 2006-275916 A | 10/2006 |
| JP | 2006-292782 A | 10/2006 |
| WO | WO 98/28646 A1 | 7/1998 |
| WO | WO 2009/008838 A1 | 1/2009 |

OTHER PUBLICATIONS

Extended European Search Report (EESR) dated Jul. 10, 2012 (in English) in counterpart European Application No. 12001468.3.
Simon Poland et al.: "Using adaptive optics for deep in-vivo multiphoton FLIM": Proceedings of SPIE: Jan. 1, 2011: pp. 79032C-79032C-7; XP 55017228.

*Primary Examiner* — William Choi
(74) *Attorney, Agent, or Firm* — Holtz, Holtz, Goodman & Chick, PC

(57) ABSTRACT

A microscope apparatus includes a laser beam source for emitting a laser beam, an objective lens for irradiating a sample with the laser beam, a phase-modulating spatial light modulator placed between the laser beam source and the objective lens at a position optically conjugate with a pupil position of the objective lens, and a beam diameter variable unit placed between the laser beam source and the phase-modulating spatial light modulator for varying a beam diameter of the laser beam incident to the phase-modulating spatial light modulator.

15 Claims, 3 Drawing Sheets

ABSTRACT# MICROSCOPE APPARATUS

CROSS REFERENCE TO RELATED APPLICATIONS

This application is based upon and claims the benefit of priority from the prior Japanese Patent Application No. 2011-053070, filed Mar. 10, 2011, the entire contents of which are incorporated herein by this reference.

BACKGROUND OF THE INVENTION

1. Field of the Invention

The present invention relates to microscope apparatuses, and more particularly, to a microscope apparatus using a phase-modulating spatial light modulator.

2. Description of the Related Art

In the field of biological microscopy, there is known a fluorescence observation method which discovers biological functions by using fluorescence imaging and sampling operation with light stimulation (such as photoactivation, photoconversion, cell function control and activation) in combination. In the fluorescence observation method, two-photon excitation with use of a laser beam is also often used because the two-photon excitation enables observation of the deep regions of a biological organism and is also less destructive to the biological organism.

With the above-mentioned fluorescence observation method, microscopes are required to have a function to change the pattern (shape, size, the number of spots, etc.) of light irradiating a sample and the irradiation position thereof arbitrary at high speed depending on the sample and its application. This function can be implemented by using a phase-modulating spatial light modulator (hereinafter referred to as SLM) placed at a position optically conjugate with a pupil position of an objective lens (hereinafter referred to as a pupil conjugate position). The apparatuses relating to such technologies are disclosed, for example, in Japanese Patent Laid-Open No. 2006-72280 and U.S. Pat. No. 7,733,564.

According to the optical apparatus including a phase-modulating SLM placed at the pupil conjugate position of the objective lens, the phase-modulating SLM modulates the phase of a laser beam at the pupil conjugate position to control the wave front, which makes it possible to form an arbitrary light pattern on a sample plane via the objective lens that functions as a Fourier transform lens. It also becomes possible to adjust the irradiation position in an optical axis direction of the objective lens and to perform aberration correction of the objective lens.

In the fluorescence observation method, laser beams of various wavelengths are used as excitation light depending on fluorescent materials. With the laser beam from a light source, a beam divergence (spread angle) and a beam waist position are changed depending on an emitted wavelength and individual difference of the laser beam source. The change in divergence and beam waist position, which influences a beam diameter and a degree of convergence of the laser beam at the pupil position of the objective lens, produces various undesirable consequences such as loss in the amount of light due to the beam diameter being excessively large with respect to the pupil diameter, deterioration in resolution due to the beam diameter being excessively small, and change in irradiation position due to variations in the degree of convergence of the laser beam.

Moreover in the fluorescence observation method, while various objective lenses are used depending on observation objects and other factors, they each have different aberration characteristics and pupil diameter. The difference in aberration characteristics and pupil diameter of the objective lens produces various undesirable consequences such as deterioration in focusing performance due to insufficient aberration correction, loss in the amount of light due to the beam diameter being excessively large with respect to the pupil diameter, and deterioration in resolution due to the beam diameter being excessively small.

Thus, in the microscope apparatuses for use in the fluorescence observation method, due consideration needs to be given to the characteristics of the objective lens and the laser beam source to be used (or the wavelength thereof), so that desired performance can be achieved.

SUMMARY OF THE INVENTION

In one aspect of the present invention, there is provided a microscope apparatus including: a laser beam source for emitting a laser beam; an objective lens for irradiating a sample with the laser beam; a phase-modulating SLM placed between the laser beam source and the objective lens at a position optically conjugate with a pupil position of the objective lens; and a beam diameter variable unit placed between the laser beam source and the phase-modulating SLM for varying a beam diameter of the laser beam incident to the phase-modulating SLM.

BRIEF DESCRIPTION OF THE DRAWINGS

The present invention will be more apparent from the following detailed description when the accompanying drawings are referenced, in which.

DESCRIPTION OF THE PREFERRED EMBODIMENTS

<Embodiment 1>

Figure 1A:
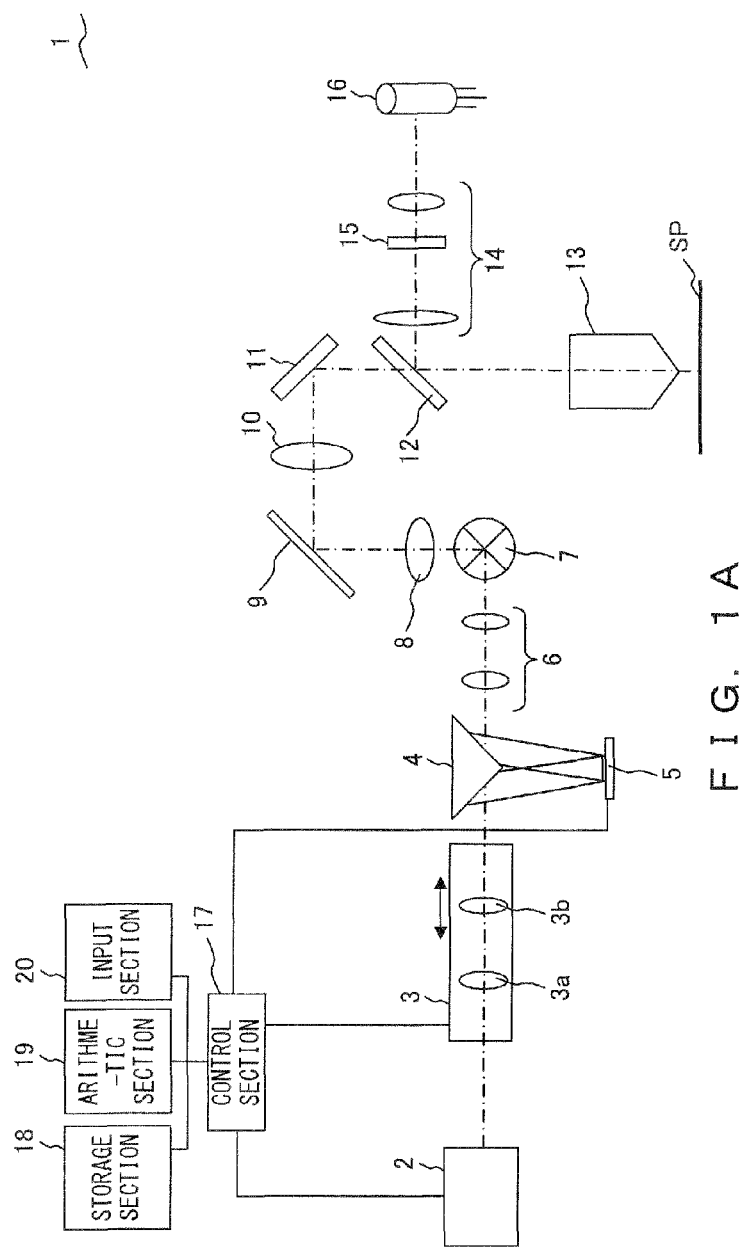
FIG. 1A is a view showing a structure of a microscope apparatus according to an embodiment 1.
Figure 1B:
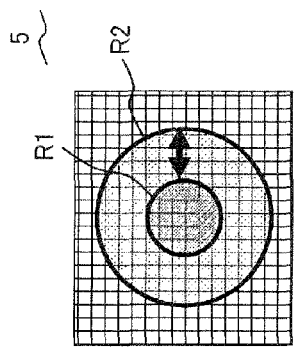
FIG. 1B is a view showing a concrete example of an effect of a beam diameter variable optical system included in the microscope apparatus shown in FIG. 1A.

FIG. 1A and FIG. 1B are views for describing a microscope apparatus according to the present embodiment. FIG. 1A illustrates a structure of the microscope apparatus according to the present embodiment, while FIG. 1B shows a concrete example of an effect of a beam diameter variable optical system included in the microscope apparatus shown in FIG. 1A.

The microscope apparatus 1 according to the present embodiment illustrated in FIG. 1A is a two-photon excitation microscope apparatus which excites an unshown sample placed on a sample plane SP through two-photon process with use of an ultrashort pulse laser beam of an infrared region emitted from a titanium sapphire laser 2 that is a laser beam source and which detects fluorescence generated by the excitation.

The microscope apparatus 1 includes a titanium sapphire laser 2 for emitting an ultrashort pulse laser beam, a beam diameter variable optical system 3 as a means of varying the beam diameter of the laser beam from the titanium sapphire laser 2, a prism-type mirror 4, a phase-modulating SLM 5 for modulating the phase of the laser beam at a pupil conjugate position of an objective lens 13 to control the wave front thereof, a pupil relay lens 6, an XY scanner 7 which is a light deflection unit for deflecting the laser beam so that the sample is two-dimensionally scanned within an XY plane orthogonal to the optical axis of the objective lens 13, a pupil relay lens 8, a mirror 9, a tube lens 10, a mirror 11, a dichroic mirror 12 having wavelength characteristics of transmitting the laser beam emitted from the titanium sapphire laser 2 and reflecting fluorescence, and the objective lens 13 for irradiating the sample on the sample plane SP with the laser beam.

In this case, the phase-modulating SLM 5 is placed between the titanium sapphire laser 2 and the objective lens 13 at the pupil conjugate position of the objective lens 13. The XY scanner 7 is placed between the phase-modulating SLM 5 and the objective lens 13 at the pupil conjugate position of the objective lens 13. More specifically, in the microscope apparatus 1, the phase-modulating SLM 5, the XY scanner 7 and the pupil position of the objective lens 13 are in an optically conjugate relation. Therefore, the pupil relay lens 6 is structured to project the phase-modulating SLM 5 on the XY scanner 7, and the pupil relay lens 8 and the tube lens 10 are structured to project the XY scanner 7 on the pupil position of the objective lens 13.

As the phase-modulating SLM 5, devices such as a reflection-type liquid crystal phase modulator, a reflection-type mirror phase modulator which produces a difference in optical path length by driving the mirror, and a deformable mirror may be used. Although FIG. 1A illustrates the case where the phase-modulating SLM 5 is a reflection-type device, the phase-modulating SLM 5 is not limited to the reflection-type device but may be, for example, a transmission-type device such as a transmission-type liquid crystal phase modulator. As the XY scanner 7, devices such as a galvano mirror and an acoustic optical deflector (AOD) may be used.

The beam diameter variable optical system 3 placed between the titanium sapphire laser 2 and the phase-modulating SLM 5 is composed of two groups of optical devices (a lens group 3a and a lens group 3b) as illustrated in FIG. 1A. In the beam diameter variable optical system 3, an interval between the lens group 3a and the lens group 3b which is placed movably in an optical axis direction is changed by the movement of the lens group 3b in the optical axis direction, by which the beam diameter of the laser beam incident to the phase-modulating SLM 5 can be varied. More specifically, the beam diameter variable optical system 3 is a beam diameter variable unit which changes the beam diameter of the laser beam in accordance with a moving amount and a moving direction of the lens group 3b. For example, as illustrated in FIG. 1B, a laser beam irradiation area on the phase-modulating SLM 5 may be widened from an irradiation area R1 to an irradiation area R2 and may also conversely be narrowed from the irradiation area R2 to the irradiation area R1.

Although FIG. 1A shows an example in which the lens group 3b is moved in the optical axis direction to change an interval between the lens group 3a and the lens group 3b, the lens group 3a may be moved in the optical axis direction to change the interval. In short, the beam diameter variable optical system 3 may be structured so that at least one of two lens groups that constitute the beam diameter variable optical system 3 is placed movably in the optical axis direction.

The microscope apparatus 1 further includes, on an optical path of reflected light from the dichroic mirror 12 that reflects fluorescence, a relay lens 14, an IR cut filter 15 for blocking light with wavelengths in the infrared region, and a photomultiplier 16 (hereinafter referred to as PMT) which is a photodetector for converting fluorescence into an electrical signal.

The PMT 16 should preferably be placed in the vicinity of a position optically conjugate with the pupil position of the objective lens 13. In the microscope apparatus 1, the PMT 16 is placed in the vicinity of a position where the pupil of the objective lens 13 is projected by the relay lens 14, so that fluorescence generated in arbitrary regions of the sample 13 may be detected.

The microscope apparatus 1 further includes a control section 17 for controlling the microscope apparatus 1, a storage section 18, an arithmetic section 19, and an input section 20 for receiving input of instructions from users. Examples of instructions inputted by users into the input section 20 include the pattern of light that irradiates the sample, the irradiation position, the objective lens to be used, and the wavelength of the laser beam to be used.

The control section 17 is electrically connected to the storage section 18, the arithmetic section 19 and the input section 20, as well as to the titanium sapphire laser 2, the beam diameter variable optical system 3 and the phase-modulating SLM 5 so as to control these devices as illustrated in FIG. 1A.

As information relating to the objective lenses (including the objective lens 13) for use in the microscope apparatus 1, the pupil diameter, the aberration characteristics, the focal length of the objective lens and the like are stored in the storage section 18. As information relating to the wavelength of laser beams emitted from the laser beam sources (including the titanium sapphire laser 2) for use in the microscope apparatus 1, the wavelength, the beam diameter and divergence at the time of emitting a laser beam of the wavelength, and the like are also stored therein. In the case where a plurality of laser beam sources are switchingly used, the information relating to the wavelength of laser beams emitted from the laser beam sources is stored for every laser beam source.

Further, the storage section 18 stores a parameter of the control section 17 for controlling the beam diameter variable optical system 3. The parameter of the control section 17 is, for example, a pulse count inputted into an unshown stepping motor which moves the lens group 3b or a moving distance of the lens group 3b in the optical axis direction when the lens group 3b is in a reference position. It is to be noted that the parameter of the control section 17 is stored in association with the pupil diameter of an objective lens included in the information relating to the objective lenses (first information) and in association with the wavelength and the beam diameter and divergence at the time of emitting a laser beam of the wavelength included in the information relating to the wavelength of laser beams emitted from the laser beam sources (second information).

Hereinafter, a detailed description will be given of various controls by the control section 17 of the microscope apparatus 1.

The titanium sapphire laser 2 is controlled by the control section 17 in accordance with the wavelength to be used which is inputted into the input section 20. In response to the control by the control section 17, the titanium sapphire laser 2 changes the wavelength of the laser beam to be emitted to a wavelength inputted into the input section 20.

The beam diameter variable optical system 3 is controlled by the control section 17 in accordance with the objective lens to be used which is inputted into the input section 20 (in this case, the objective lens 13) and in accordance with the wavelength of the laser beam emitted from the laser beam source to be used (in this case, the titanium sapphire laser 2).

More specifically, the control section 17 reads the control parameter of the control section 17, which is associated with the pupil diameter of the objective lens 13 and with the wavelength of the laser beam emitted from the titanium sapphire laser 2, the beam diameter and divergence at the time of emitting a laser beam of the wavelength, from the storage section 18 and controls the beam diameter variable optical system 3 based on the read control parameter. In response to the control by the control section 17, the beam diameter variable optical system 3 moves the lens group 3b of the beam diameter variable optical system 3 in the optical axis direction to thereby change the beam diameter of the laser beam incident to the phase-modulating SLM 5. Thus, the control section 17 controls the beam diameter variable optical system 3 in accordance with the objective lens to be used and the wavelength of the laser beam emitted from the laser beam source to be used. Consequently, under various apparatus conditions including variations in pupil diameter of the objective lens, variations in wavelength of the laser beam, and variations in beam diameter and divergence of the laser beam at the time of being emitted from the beam source, the microscope apparatus 1 can make the laser beam with an optimal beam diameter corresponding to the pupil diameter of the objective lens to be used incident to the pupil position of the objective lens. This makes it possible to prevent loss in the amount of light due to the beam diameter being excessively large with respect to the pupil diameter and to prevent deterioration in resolution due to the beam diameter being excessively small.

The phase-modulating SLM 5 is controlled by the control section 17 in accordance with the objective lens to be used inputted into the input section 20 (in this case, the objective lens 13), the wavelength of the laser beam emitted from the laser beam source to be used (in this case, the titanium sapphire laser 2), and in accordance with the light pattern and the irradiation position inputted into the input section 20.

More specifically, the control section 17 reads information relating to the objective lens 13 (such as the pupil diameter, the aberration characteristics, and the focal length) and information relating to the wavelength of the laser beam emitted from the titanium sapphire laser 2 (such as the wavelength, and the beam diameter and divergence at the time of emitting a laser beam of the wavelength) from the storage section 18, and transmits these information to the arithmetic section 19 together with the information relating to the light pattern and the irradiation position inputted into the input section 20. The arithmetic section 19 calculates a modulation pattern of the phase-modulating SLM 5 for forming the light pattern inputted into the input section 20 at the irradiation position inputted into the input section 20 based on the information transmitted from the control section 17, and transmits the information relating to the calculated modulation pattern to the control section 17. The control section 17 controls the phase-modulating SLM 5 in accordance with the information relating to the modulation pattern transmitted from the arithmetic section 19, and the phase-modulating SLM 5 changes the modulation pattern to modulate the phase of the laser beam in response to the control by the control section 17.

Thus, the control section 17 controls the phase-modulating SLM 5 in accordance with the light pattern and the irradiation position inputted into the input section 20 as well as the objective lens to be used and the wavelength of the laser beam emitted from the laser beam source to be used. Consequently, under various apparatus conditions including variations in pupil diameter, aberration characteristics and focal length of an objective lens, variations in wavelength of the laser beam emitted from the light source and variations in beam diameter and divergence for emitting a laser beam of the wavelength, the microscope apparatus 1 can optimally adjust the divergence of the laser beam at the pupil position of the objective lens to be used, and can sufficiently correct aberration on the sample plane. This makes it possible to prevent deterioration in focusing performance due to insufficient aberration correction and to prevent change in irradiation position due to variations in the degree of convergence of the laser beam and to thereby form a desired light pattern at a desired irradiation position. For calculation of the modulation pattern, the arithmetic section 19 may further use the control parameter of the control section 17, which is used for the control of the beam diameter variable optical system 3, as the information relating to the beam diameter of the laser beam emitted from the beam diameter variable optical system 3.

In the microscope apparatus 1 according to the present embodiment, the beam diameter variable optical system 3 and the phase-modulating SLM 5 are controlled in accordance with the objective lens to be used and the wavelength of the laser beam emitted from the laser beam source to be used, so that the pattern of light irradiating the sample and the irradiation position of the light can arbitrarily be changed with high efficiency in utilization of light under various apparatus conditions.

Moreover, in the microscope apparatus 1 according to the present embodiment, the beam diameter variable optical system 3, which optimizes the beam diameter in accordance with the pupil diameter of the objective lens to be used, is composed of two groups of optical devices. Accordingly, the microscope apparatus 1 can support various apparatus conditions including variations in pupil diameter of an objective lens not with an excessively complicated apparatus structure but with a simple structure. In addition, the beam diameter variable optical system 3 composed of two groups of optical devices can suppress increase in divergence of the laser beam caused by change in beam diameter, so that the correction amount of divergence in the phase-modulating SLM 5 can be suppressed. Since a small moving amount can change the beam diameter by a relatively large margin, the beam diameter can be changed at relatively high speed.

In the microscope apparatus 1 according to the present embodiment, the beam diameter variable optical system. 3, which changes the beam diameter by moving an optical device in the optical axis direction, optimizes the beam diameter with respect to the pupil diameter of the objective lens to be used, and therefore the beam diameter variable optical system 3 mainly contributes to the improvement of efficiency in utilization of light. Meanwhile, the changes in pattern of light that irradiates the sample and in irradiation position of the light are mainly achieved by the phase-modulating SLM 5 which can operate at high speed compared to the movement of the optical device. Therefore, the microscope apparatus 1 can achieve high-speed changes in pattern of light that irradiates the sample and in irradiation position of the light.

Although the titanium sapphire laser 2 for two-photon excitation was illustrated as a light source of the microscope apparatus 1 in FIG. 1A, the light source is not limited to the titanium sapphire laser 2. The light source may be any laser beam sources with coherence property such as a visible light laser.

In the case of a microscope apparatus which uses only a laser beam of a specific wavelength emitted from a specific laser beam source, the control section 17 may control the beam diameter variable optical system 3 in accordance with the objective lens to be used. In the case of a microscope apparatus which uses only a specific objective lens, the control section 17 may control the beam diameter variable optical system 3 in accordance with the wavelength of the laser beam emitted from the titanium sapphire laser 2.

<Embodiment 2>

Figure 2:
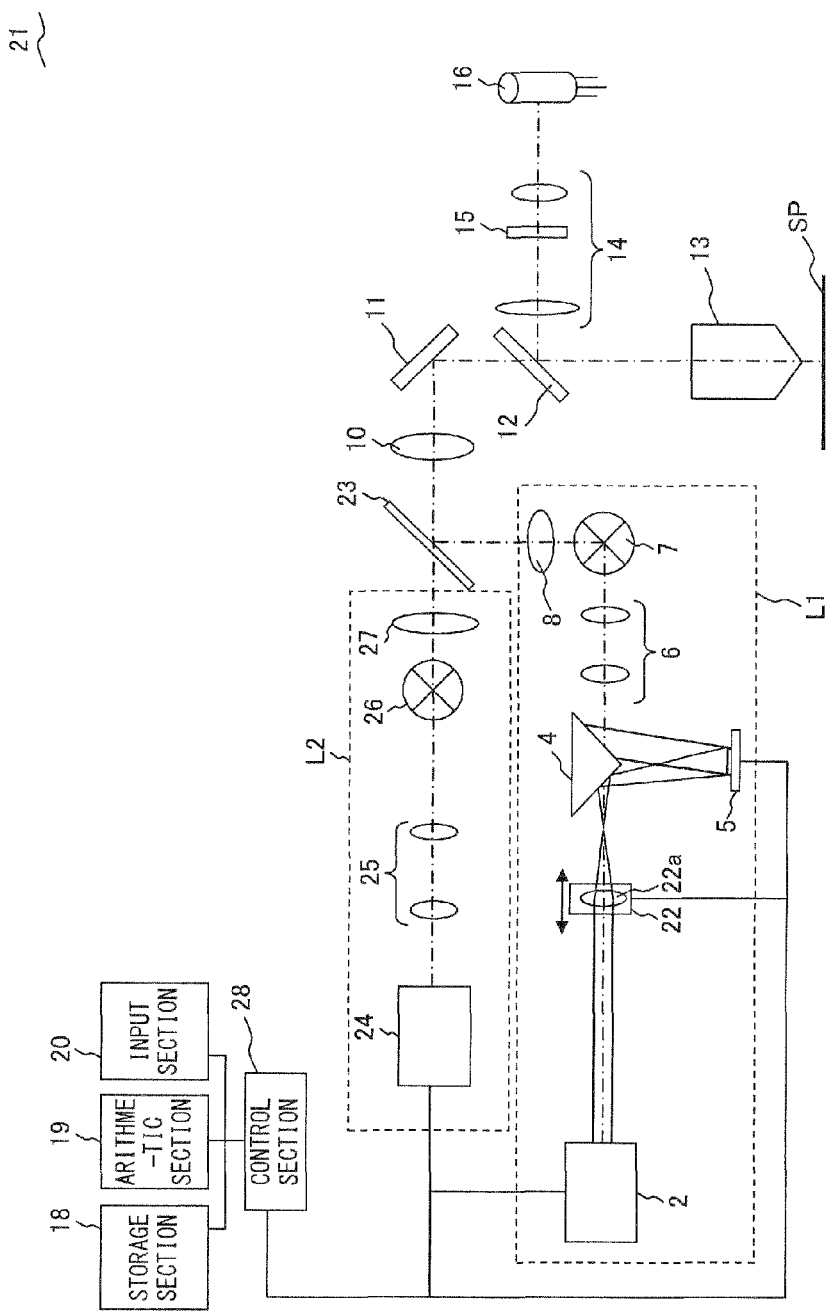
FIG. 2 is a view illustrating a structure of a microscope apparatus according to an embodiment 2.

FIG. 2 is a view illustrating a structure of a microscope apparatus according to the present embodiment. A microscope apparatus 21 according to the present embodiment illustrated in FIG. 2 is a two-photon excitation microscope apparatus for concurrently performing fluorescence imaging and sampling operation with light stimulation.

The microscope apparatus 21 is different from the microscope apparatus 1 in the embodiment 1 illustrated in FIG. 1A in the point that: a lighting unit L2 for fluorescence imaging is provided in addition to a lighting unit L1 for stimulation; the lighting unit L1 for stimulation includes a beam diameter variable optical system 22 in place of the beam diameter variable optical system 3; a dichroic mirror 23 is provided which reflects a laser beam from the lighting unit L1 and transmits a laser beam from the lighting unit L2; and a control section 28 is provided in place of the control section 17. Other structural aspects of the microscope apparatus 21 are similar to those of the microscope apparatus 1 in the embodiment 1. In FIG. 2, component members identical to those of the microscope apparatus 1 are denoted by identical reference signs.

Hereafter, the microscope apparatus 21 will be described with the attention mainly given to the difference from the microscope apparatus 1.

The lighting unit L2, which is a lighting unit for fluorescence imaging, includes a titanium sapphire laser 24 (second laser beam source) for emitting an infrared laser beam with a wavelength different from that of the titanium sapphire laser 2, a beam expander 25 for changing the beam diameter of a laser beam to a specified diameter, an XY scanner 26 which is a light deflection unit for deflecting the laser beam so that the sample is two-dimensionally scanned within an XY plane orthogonal to the optical axis of the objective lens 13, and a pupil relay lens 27.

The XY scanner 26 is placed at a pupil conjugate position of the objective lens 13. More specifically, in the microscope apparatus 21, the XY scanner 26 and the pupil position of the objective lens 13 are in an optically conjugate relation. Therefore, the pupil relay lens 27 and the tube lens 10 are structured to project the XY scanner 26 on the pupil position of the objective lens 13. As the XY scanner 26, as with the XY scanner 7, devices such as a galvano mirror and an acoustic optical deflector (AOD) may be used.

The lighting unit L1 is similar in structure to the lighting unit included in the microscope apparatus 1 except for the point that the beam diameter variable optical system 22 is substituted for the beam diameter variable optical system 3. The beam diameter variable optical system 22 placed between the titanium sapphire laser 2 and the phase-modulating SLM 5 is composed of one group of optical devices (lens group 22a) which is placed movable in the optical axis direction and which has refractive power as illustrated in FIG. 2.

The beam diameter variable optical system 22 can change an optical path length between the lens group 22a and the phase-modulating SLM 5 by the movement of the lens group 22a in the optical axis direction, by which the beam diameter of the laser beam incident to the phase-modulating SLM 5 can be varied. More specifically, the beam diameter variable optical system 22 is a beam diameter variable unit which changes the beam diameter of the laser beam in accordance with a moving amount and a moving direction of the lens group 22a. For example, as illustrated in FIG. 1B, as with the beam diameter variable optical system 3 illustrated in FIG. 1A, a laser beam irradiation area on the phase-modulating SLM 5 may be widened from an irradiation area R1 to an irradiation area R2 and may also conversely be narrowed from the irradiation area R2 to the irradiation area R1.

The dichroic mirror 23 is a dichroic mirror which is placed between the phase-modulating SLM 5 and the objective lens 13 and which has a wavelength characteristic of reflecting a laser beam from the lighting unit L1 and transmitting a laser beam from the lighting unit L2. The dichroic mirror 23 functions as an optical path combining unit for combining a laser beam emitted from the titanium sapphire laser 2 and a laser beam emitted from the titanium sapphire laser 24 and guiding the combined beam in the optical axis direction of the objective lens 13. This makes it possible to concurrently perform fluorescence imaging and sampling operation with light stimulation.

The control section 28 is different from the control section 17 included in the microscope apparatus 1 in the embodiment 1 in the point that a plurality of laser beam sources (titanium sapphire laser 2 and titanium sapphire laser 24) are connected thereto. The control section 28 is similar to the control section 17 included in the microscope apparatus 1 in the embodiment 1 in the point of controlling the beam diameter variable optical system 22 and the phase-modulating SLM 5 in accordance with the objective lens to be used and the wavelength of the laser beam emitted from the laser beam source to be used. However, the control section 28 is further different from the control section 17 in the point of controlling the beam diameter variable optical system 22 and the phase-modulating SLM 5 so that a focal plane (first focal plane) on the sample with a laser beam emitted from the titanium sapphire laser 2 focused thereon and a focal plane (second focal plane) on the sample with a laser beam emitted from the titanium sapphire laser 24 focused thereon coincide with each other.

Accordingly, the storage section 18 preferably stores not only the information relating to the wavelength of the laser beam emitted from the titanium sapphire laser 2 but also the information relating to the wavelength of the laser beam emitted from the titanium sapphire laser 24 for calculation of the focal plane (second focal plane) on the sample with the laser beam emitted from the titanium sapphire laser 24 focused thereon.

According to the microscope apparatus 21 in the present embodiment, the beam diameter variable optical system 22 and the phase-modulating SLM 5 are controlled in accordance with the objective lens to be used and the wavelength of the laser beam emitted from the laser beam source to be used, so that the effect similar to that of the microscope apparatus 1 in the embodiment 1 can be achieved. In short, the pattern of light that irradiates the sample and the irradiation position of the light can arbitrarily be changed with high efficiency in utilization of light under various apparatus conditions. It also becomes possible to achieve high-speed changes in pattern of light that irradiates the sample and in irradiation position of the light.

According to the microscope apparatus 21 in the present embodiment, the focal plane of the lighting unit L1 and the focal plane of lighting unit L2 can accurately coincide with each other, so that while fluorescence imaging is performed with the lighting unit L2, the plane subjected to the fluorescence imaging can be stimulated with light from the lighting unit L1. In that case, the wavelength used for light stimulation can be changed without changing the focal plane. For example, during fluorescence imaging, glutamate uncaging can be performed with a laser beam with a wavelength of 720 nm from the lighting unit L1, and then, photoconversion can be performed on the same plane with use of a laser beam with a wavelength of 800 nm.

Moreover, in the microscope apparatus 21 according to the present embodiment, the beam diameter variable optical system 22, which optimizes the beam diameter in accordance with the pupil diameter of the objective lens to be used, is composed of one group of optical devices. Accordingly, the microscope apparatus 21 can support various apparatus conditions including variations in pupil diameter of an objective lens with a structure simpler than the structure of the microscope apparatus 1 in the embodiment 1. In addition, the beam diameter variable optical system 22 composed of one group of optical devices is small in the number of lenses included, so that loss in the amount of light generated in the beam diameter variable optical system 22 can be suppressed.

Although the titanium sapphire laser for two-photon excitation was illustrated as a light source of the lighting unit L1 and the lighting unit L2 for the microscope apparatus 21 in FIG. 2, the light source is not limited to the titanium sapphire laser. The light source may be any laser beam sources with coherence property such as a visible light laser.

Although FIG. 2 showed an example in which the lighting unit L1 is used as a means of light stimulation and the lighting unit L2 is used as a means of fluorescence imaging, the usage of the lighting unit L1 and the lighting unit L2 is not limited thereto. The lighting unit L1 may be used as a means of fluorescence imaging, and the lighting unit L2 may be used as a means of light stimulation. Alternatively, both the lighting unit L1 and the lighting unit L2 may be used as a means of light stimulation or a means of fluorescence imaging.

As in the case of the embodiment 1, the control section 28 may control the beam diameter variable optical system 22 in accordance with the objective lens to be used, and may control the beam diameter variable optical system 22 in accordance with the wavelength of laser beams emitted from the titanium sapphire laser 2 and the titanium sapphire laser 24.

<Embodiment 3>

Figure 3:
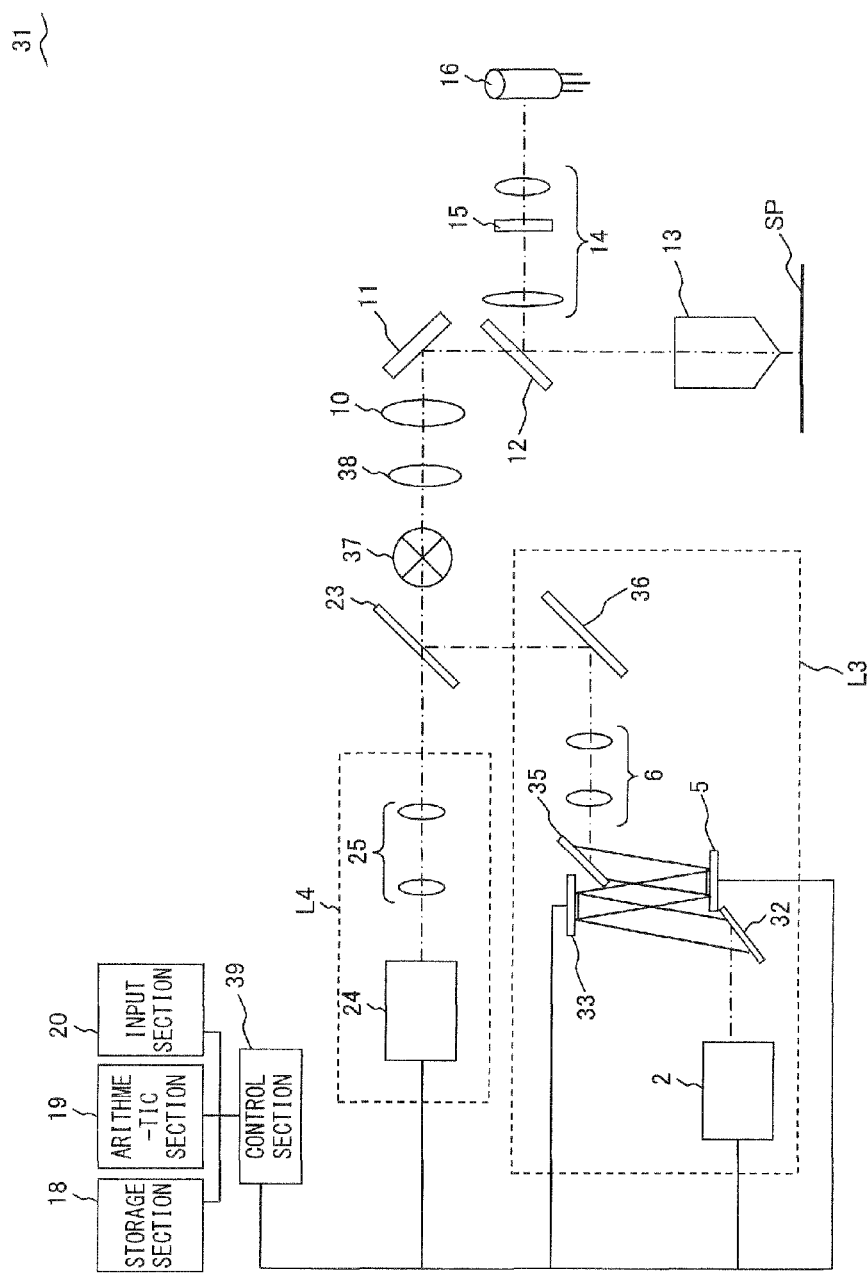
FIG. 3 is a view illustrating a structure of a microscope apparatus according to an embodiment 3.

FIG. 3 is a view illustrating a structure of a microscope apparatus according to the present embodiment. A microscope apparatus 31 according to the present embodiment illustrated in FIG. 3 is a two-photon excitation microscope apparatus for concurrently performing fluorescence imaging and sampling operation with light stimulation.

The microscope apparatus 31 is different from the microscope apparatus 21 in the embodiment 2 illustrated in FIG. 2 in the point that: a lighting unit L3 for fluorescence imaging is provided in place of the lighting unit L1 for stimulation; a lighting unit L4 for fluorescence imaging is provided in place of the lighting unit L2 for fluorescence imaging; an XY scanner 36 and a pupil relay lens 37 are provided between the dichroic mirror 23 and the objective lens 13; and a control section 38 is provided in place of the control section 17. Other structural aspects of the microscope apparatus 31 are similar to those of the microscope apparatus 21 in the embodiment 2. In FIG. 3, component members identical to those of the microscope apparatus 21 are denoted by identical reference signs.

Hereafter, the microscope apparatus 31 will be described with the attention mainly given to the difference from the microscope apparatus 21.

The lighting unit L3 includes a titanium sapphire laser 2 for emitting an ultrashort pulse laser beam, a mirror 32, a phase-modulating SLM 33, a phase-modulating SLM 5 for modulating the phase of the laser beam at a pupil conjugate position of the objective lens 13 to control the wave front thereof, a pupil relay lens 6, and a mirror 35.

The lighting unit L3 is different from the lighting unit L1 included in the microscope apparatus 21 in the embodiment 2 in the point that: the XY scanner 7 and the pupil relay lens 8 provided on the light source (titanium sapphire laser 2) side of the dichroic mirror 23 are omitted; and the phase-modulating SLM 33 which functions as a beam diameter variable unit is provided in place of the beam diameter variable optical system 3.

The lighting unit L4 is different from the lighting unit L2 included in the microscope apparatus 21 in the embodiment 2 in the point that the XY scanner 26 and the pupil relay lens 27 provided on the light source (titanium sapphire laser 24) side of the dichroic mirror 23 are omitted.

In the microscope apparatus 31, the XY scanner 36 and the pupil relay lens 37 placed between the dichroic mirror 23 and the objective lens 13 are used in place of the XY scanner and the pupil relay lens omitted in the lighting unit L3 and the lighting unit L4.

The control section 38 is different from the control section 28 included in the microscope apparatus 21 in the embodiment 2 in the point that a plurality of phase-modulating SLMs (phase-modulating SLM 5 and phase-modulating SLM 33) are connected thereto.

According to the microscope apparatus 31 in the present embodiment, the phase-modulating SLM 33 and the phase-modulating SLM 5 are controlled in accordance with the objective lens to be used and the wavelength of the laser beam emitted from the laser beam source to be used, so that the effect similar to that of the microscope apparatus 21 in the embodiment 2 can be achieved. In short, the pattern of light that irradiates the sample and the irradiation position of the light can arbitrarily be changed with high efficiency in utilization of light under various apparatus conditions. It also becomes possible to change the pattern of light that irradiates the sample and the irradiation position of the light at high speed. Moreover, the focal plane of the lighting unit L3 and the focal plane of the lighting unit L4 can accurately coincide.

In the microscope apparatus 31 according to the present embodiment, the lighting unit L3 and the lighting unit L4 share the XY scanner 36, so that a laser beam from the titanium sapphire laser 2 and a laser beam from the titanium sapphire laser 24 can irradiate the same position with the same timing. This makes it possible to achieve detection of completely synchronized two wavelengths of the laser beams from the lighting unit L3 and the lighting unit L4.

Moreover, in the microscope apparatus 31 according to the present embodiment, the beam diameter variable optical unit which optimizes the beam diameter in accordance with the pupil diameter of the objective lens to be used is not a lens but the phase-modulating SLM 33. Accordingly, the microscope apparatus 31 can be made more compact in structure than the microscope apparatus 21 in the embodiment 2. Furthermore, the beam diameter can be changed at relatively high speed since movement of the lens is not involved.

Although the titanium sapphire laser for two-photon excitation was illustrated as a light source of the lighting unit L3 and the lighting unit L4 for the microscope apparatus 31 in FIG. 3, the light source is not limited to the titanium sapphire laser. The light source may be any laser beam sources with coherence property such as a visible light laser.

Although FIG. 3 showed an example in which the lighting unit L3 and the lighting unit L4 are used as a means of fluorescence imaging, the usage of the lighting unit L3 and the lighting unit L4 is not limited thereto. Either the lighting unit L3 or the lighting unit L4 may be used as a means of light stimulation, or both the lighting unit L3 and the lighting unit L4 may be used as a means of light stimulation.

As in the case of the embodiment 1, the control section 38 may control the phase-modulating SLM 33 in accordance with the objective lens to be used, and may control the phase-modulating SLM 33 in accordance with the wavelength of laser beams emitted from the titanium sapphire laser 2 and the titanium sapphire laser 24.

Although the embodiments 1 to 3 illustrate two-photon excitation microscope apparatuses, microscope apparatuses according to the present invention are not limited to the two-photon excitation microscope apparatuses. They may be generally applied to any laser microscope apparatuses using laser beam sources.

What is claimed is:

1. A microscope apparatus, comprising:
a laser beam source for emitting a laser beam;
an objective lens for irradiating a sample with the laser beam;
a phase-modulating spatial light modulator placed between the laser beam source and the objective lens at a position optically conjugate with a pupil position of the objective lens; and
a beam diameter variable unit placed between the laser beam source and the phase-modulating spatial light modulator for varying a beam diameter of the laser beam incident to the phase-modulating spatial light modulator.

2. The microscope apparatus according to claim 1, further comprising a control section for controlling the beam diameter variable unit in accordance with the objective lens and a wavelength of the laser beam emitted from the laser beam source,
wherein the beam diameter variable unit changes the beam diameter of the laser beam incident to the phase-modulating spatial light modulator in response to control by the control section.

3. The microscope apparatus according to claim 2, further comprising a storage section for storing a parameter of the control section, the parameter being associated with first information relating to an objective lens and second information relating to a wavelength of a laser beam,
wherein the control section controls the beam diameter variable unit in accordance with the parameter of the control section stored in the storage section, the parameter being associated with the first information corresponding to the objective lens and the second information corresponding to the wavelength of the laser beam emitted from the laser beam source.

4. The microscope apparatus according to claim 3, wherein the first information represents a pupil diameter of the objective lens, and the second information represents a wavelength, a beam diameter, and a divergence.

5. The microscope apparatus according to claim 4, wherein the control section controls the phase-modulating spatial light modulator in accordance with the objective lens and the wavelength of the laser beam emitted from the laser beam source, and the phase-modulating spatial light modulator modulates a phase of the laser beam in response to control by the control section.

6. The microscope apparatus according to claim 5, further comprising a light deflection unit placed between the phase-modulating spatial light modulator and the objective lens for deflecting the laser beam so that the sample is scanned in a direction orthogonal to an optical axis of the objective lens.

7. The microscope apparatus according to claim 6, further comprising:
a second laser beam source; and
an optical path combining unit placed between the phase-modulating spatial light modulator and the objective lens for combining a laser beam emitted from the laser beam source and a laser beam emitted from the second laser beam source and guiding a combined laser beam in an optical axis direction of the objective lens,
wherein the control section controls the beam diameter variable unit and the phase-modulating spatial light modulator so that a first focal plane on the sample with the laser beam emitted from the laser beam source focused thereon and a second focal plane on the sample with the laser beam emitted from the second laser beam source focused thereon coincide with each other.

8. The microscope apparatus according to claim 1, wherein the beam diameter variable unit comprises one group of optical devices which is placed movably in an optical axis direction and which has refractive power.

9. The microscope apparatus according to claim 1, wherein the beam diameter variable unit comprises two groups of optical devices, at least one of the two groups being placed movably in an optical axis direction.

10. The microscope apparatus according to claim 1, wherein the beam diameter variable unit is a phase-modulating spatial light modulator.

11. The microscope apparatus according to claim 1, further comprising a control section for controlling the beam diameter variable unit in accordance with the objective lens,
wherein the beam diameter variable unit changes the beam diameter of the laser beam incident to the phase-modulating spatial light modulator in response to control by the control section.

12. The microscope apparatus according to claim 1, further comprising a control section for controlling the beam diameter variable unit in accordance with a wavelength of the laser beam emitted from the laser beam source,
wherein the beam diameter variable unit changes the beam diameter of the laser beam incident to the phase-modulating spatial light modulator in response to control by the control section.

13. A microscope apparatus, comprising:
a laser beam source for emitting a laser beam;
an objective lens for irradiating a sample with the laser beam;
a phase-modulating spatial light modulator placed between the laser beam source and the objective lens at a position optically conjugate with a pupil position of the objective lens; and
a beam diameter variable unit placed between the laser beam source and the phase-modulating spatial light modulator for varying a beam diameter of the laser beam incident to the phase-modulating spatial light modulator;
a control section for controlling the beam diameter variable unit in accordance with the objective lens and a wavelength of the laser beam emitted from the laser beam source; and
a storage section for storing a parameter of the control section, the parameter being associated with first information relating to an objective lens and second information relating to a wavelength of a laser beam,
wherein the beam diameter variable unit changes the beam diameter of the laser beam incident to the phase-modulating spatial light modulator in response to control by the control section,
wherein the control section controls the beam diameter variable unit in accordance with the parameter of the control section stored in the storage section, the parameter being associated with the first information corresponding to the objective lens and the second information corresponding to the wavelength of the laser beam emitted from the laser beam source, and wherein the control section controls the phase-modulating spatial light modulator in accordance with the objective lens and the wavelength of the laser beam emitted from the laser beam source, and the phase-modulating spatial light modulator modulates a phase of the laser beam in response to control by the control section.

14. The microscope apparatus according to claim 13, further comprising a light deflection unit placed between the phase-modulating spatial light modulator and the objective lens for deflecting the laser beam so that the sample is scanned in a direction orthogonal to an optical axis of the objective lens.

15. The microscope apparatus according to claim 14, further comprising:
- a second laser beam source; and
- an optical path combining unit placed between the phase-modulating spatial light modulator and the objective lens for combining a laser beam emitted from the laser beam source and a laser beam emitted from the second laser beam source and guiding a combined laser beam in an optical axis direction of the objective lens,
- wherein the control section controls the beam diameter variable unit and the phase-modulating spatial light modulator so that a first focal plane on the sample with the laser beam emitted from the laser beam source focused thereon and a second focal plane on the sample with the laser beam emitted from the second laser beam source focused thereon coincide with each other.

* * * * *